Feb. 11, 1958 J. S. KILBY ET AL 2,823,262

TELEPHONE ANSWERING DEVICE

Filed Oct. 21, 1953 6 Sheets-Sheet 1

INVENTORS
KARL W. YOUNGBECK
JACK S. KILBY
BY
Wheeler, Wheeler & Wheeler
ATTORNEYS Feb. 11, 1958 J. S. KILBY ET AL 2,823,262

TELEPHONE ANSWERING DEVICE

Filed Oct. 21, 1953 6 Sheets-Sheet 2

INVENTORS
KARL W. YOUNGBECK
JACK S. KILBY
BY
Wheeler, Wheeler & Wheeler
ATTORNEYS

TELEPHONE ANSWERING DEVICE

Filed Oct. 21, 1953 6 Sheets-Sheet 3

INVENTORS
KARL W. YOUNGBECK
JACK S. KILBY
BY
Wheeler, Wheeler & Wheeler
ATTORNEYS

TELEPHONE ANSWERING DEVICE

Filed Oct. 21. 1953 6 Sheets-Sheet 4

INVENTORS
KARL W. YOUNGBECK
JACK S. KILBY
BY
Wheeler, Wheeler & Wheeler
ATTORNEYS INVENTORS
KARL W. YOUNGBECK
JACK S. KILBY
BY
Wheeler, Wheeler & Wheeler
ATTORNEYS Feb. 11, 1958 J. S. KILBY ET AL 2,823,262

TELEPHONE ANSWERING DEVICE

Filed Oct. 21, 1953 6 Sheets-Sheet 6

INVENTORS
KARL W. YOUNGBECK
JACK S. KILBY
BY
Wheeler, Wheeler & Wheeler
ATTORNEYS United States Patent Office 2,823,262
Patented Feb. 11, 1958

2,823,262

TELEPHONE ANSWERING DEVICE

Jack S. Kilby and Karl W. Youngbeck, Milwaukee, Wis., assignors to H. A. Milhaupt, Inc., a corporation of Wisconsin Application October 21, 1953, Serial No. 387,379

15 Claims. (Cl. 179—6)

This invention relates to a telephone answering device.

The device comprises interconnected but separable units which include a generally conventional recorder, desirably a wire or tape recorder; a phonograph which carries a record bearing the message or messages to be communicated to the telephone caller; and a control set which effects the electric switching, carries the telephone bell and voice coil pickups, mounts the device which lifts the telephone hand set from the cradle and supports the two separate units first mentioned.

Like other telephone answering devices, the present device is set into operation by the ringing of the telephone bell. When this occurs, the device automatically initiates a sequence of operations which includes the lifting of the hand set from the cradle of the telephone, the starting of a phonograph to give the caller the information that his message will be received and recorded, the disconnection of the phonograph pickup and the starting of the recorder to receive the message (the recorder being previously at rest), the stopping of the recorder and further connection of the phonograph to deliver a terminal message to the caller and, finally, restoration of the hand set to the cradle of the telephone to close the call.

While there are many specific features of novelty, the principal features of the present device are the following:

The recorder is not merely conventional but may be used conventionally. It is not connected mechanically with the rest of the apparatus but merely rests upon it. Its electrical connections with the rest of the apparatus comprise plugs and jacks which are almost instantly severable when the recorder is to be used elsewhere. They do not even require to be severed when the recorder is to be used without removal from the rest of the apparatus.

The power supply and amplifier of the recorder are used for all purposes of the rest of the apparatus so that no electronic equipment is needed elsewhere other than a single Thyratron tube which initiates the cycle when the telephone bell rings. Even the bell-ringing impulse is amplified in the recorder and, thus amplified, the impulse is returned to the Thyratron. Similarly the phonograph cartridge is connected to the amplifier and the amplified message returned to a speaker in proximity to the telephone for communication to the telephone caller. At another point in the cycle, the voice current from the telephone is picked up and delivered to the recorder where it is amplified for the purposes of recorder operation. The net result is not merely to make multiple use of the recorder amplifier but to eliminate all separate power connections and, further, to avoid giving false messages to the telephone caller when recording facilities are exhausted. This last result flows from the fact that conventional recorders are equipped with apparatus which stops them from functioning further if the supply of wire or tape is used up.

Another feature of novelty is the manner and facility of adjusting the relative intervals desired for receiving the caller's message. A simple adjustable cam driven from the phonograph motor, or in any other suitable manner, is used for this purpose. It operates one of a series of switches by which indexing mechanism is severally controlled to operate a gang switch that determines the functioning of the device.

Another important feature consists in a "homing" device which automatically re-synchronizes the gang switch in the event that it gets out of time.

Another feature consists in an arrangement whereby the gang switch not only determines the sequence of operations but disconnects and renders inoperative different components which are not in use at any given point in the cycle. For example, the phonograph cartridge is wholly disconnected from the amplifier while the caller's message is being recorded. In devices in which this cartridge remains in the circuit, record noises may become louder than the message itself. As another example, the recording wire or tape operates only during the precise period set aside for reception of the caller's message. In devices in which the recording spool is in operation from the time the bell rings, a great deal of recording capacity is lost during that portion of the cycle in which the phonograph is in operation to deliver the opening message and the closing message. In commercial devices currently in use, as much as half of the entire capacity of the recorder is wasted in this manner. In the present device, substantially the entire capacity of the recorder is used, the only portion wasted being that part of the time allocated to receive the caller's message which is not actually required by the caller to deliver his message.

Figure 3:
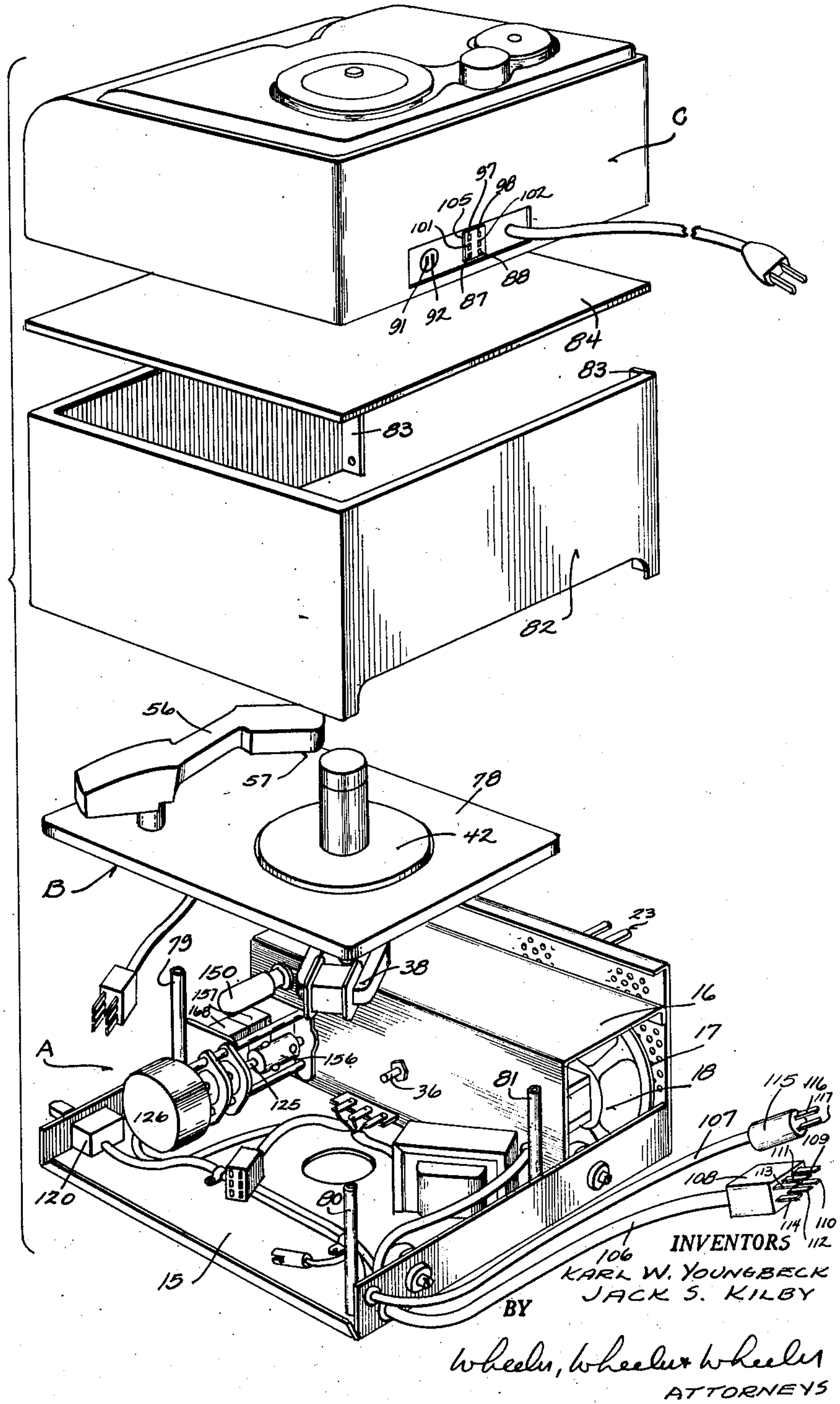
Fig. 3 is a view showing mutually separated component parts of the telephone answering device.

As best shown in Fig. 3, the control set A comprises a base 15 at the front of which is a skeletonized housing 16 which includes a foraminous grill 17 behind which there is mounted a speaker 18. Through an aperture in the grill projects the lifter arm 20 pivoted at 21 to a partition 22. A fork 23 at the free outer end of the arm is adapted to receive the hand set 24 of a telephone instrument shown at 25 in Fig. 1.

Figure 2:
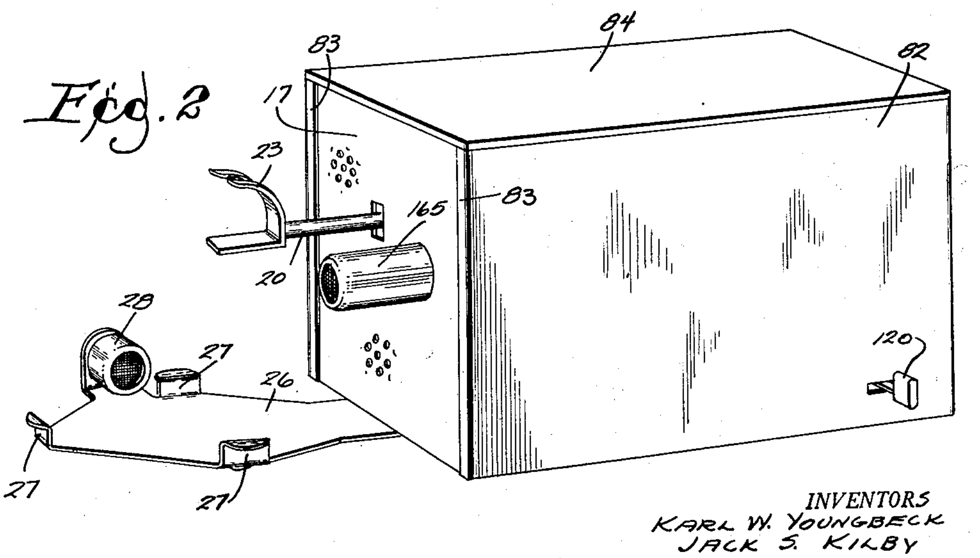
Fig. 2 is a similar view in perspective showing the essential components of the control device as sold, the recorder and the telephone set being absent.

Projecting forwardly from the base of the control set is a positioning platform 26 for the telephone instrument. This is best illustrated in Fig. 2. The clips 27 accurately locate the instrument in operative proximity to the bell ringing pickup or microphone 28 which initiates the cycling of the apparatus in a manner hereinafter to be explained.

Figure 6:
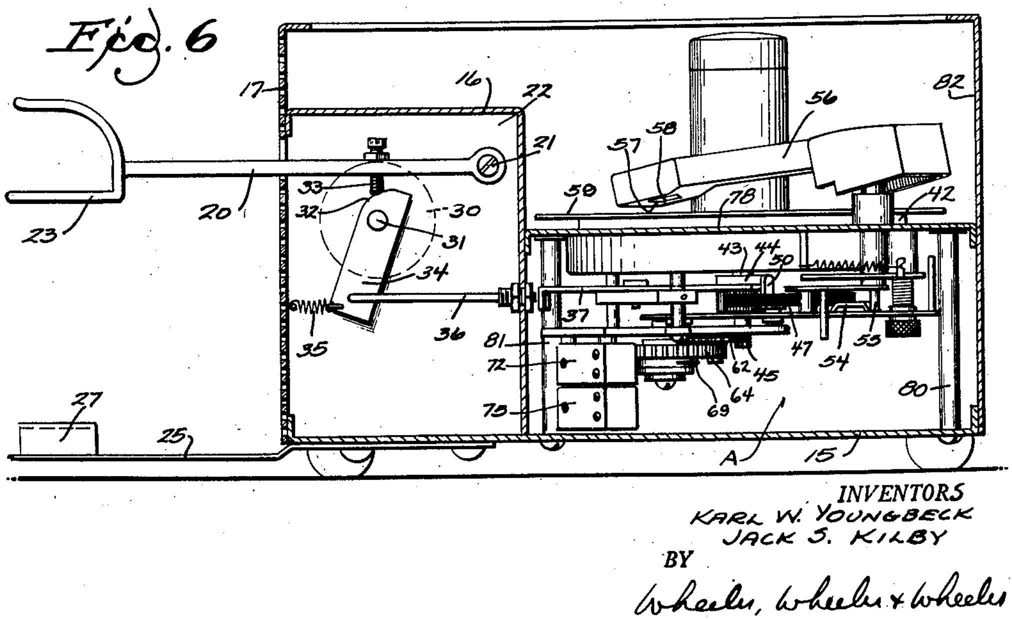
Fig. 6 is a detailed view taken in vertical section on the line 6—6 of Fig. 4.
Figure 4:
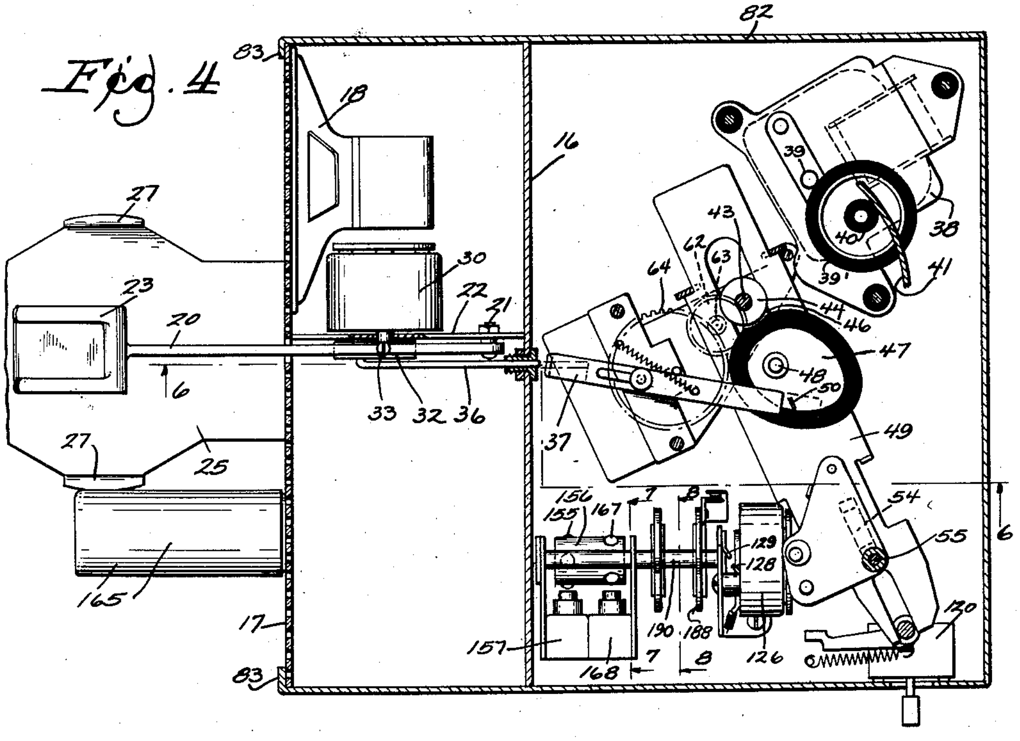
Fig. 4 is a view on an enlarged scale showing the control set and phonograph units in horizontal section in a plane immediately beneath the turntable.

Mounted on the partition 22 is a solenoid 30 which delivers motion through a rock shaft 31 having a cam 32 bearing against set screw 33 in the arm 20 to lift the telephone instrument in an amount determined by the adjustment of the set screw, which serves as a cam follower. The cam 32 forms part of a lever 34 fixed to the rock shaft and extending therebeneath to receive connection with a tension spring 35 and a push rod 36. The push rod serves to initiate operation of the generally conventional phonograph by pushing a slide 37 added to this particular phonograph in place of the cycle starting device with which it was originally provided (see Figs. 6 and 4).

The phonograph used is otherwise largely conventional except that its record drop is desirably eliminated. The means whereby the slide 37 controls the tone arm and initiates phonograph operation remains unaltered.

In this particular phonograph, the motor 38 has an armature shaft 39 which drives roller 39'. This large roller is provided with a drive roller 40 bearing against the inner rim 41 of the turntable 42. The turntable spindle shaft 43 is provided at its lower end with a knurled driving roller 44 and pinion 45. The latter represents one feature added to the phonograph.

The driving roller 44, with which the turntable spindle shaft is conventionally provided, normally rotates in a shallow notch 46 of a rubber rimmed eccentric 47 pivoted at 48 to a slide 49. Projecting from a face 47 is a finger 50 in the path of slide 37 above referred to. When the slide 37 is reciprocated against the tension of spring 51 by push rod 36 at the time the telephone instrument is lifted, the resulting movement is communicated through finger 50 to the eccentric 47, thereby rotating the eccentric sufficiently to engage an unnotched portion of its periphery with the driving roller 44. Thus during turntable rotation, the eccentric is also rotated and due to its form, it reciprocates the slide 49 downwardly as viewed in Fig. 4. The initial movement of the slide causes a lift cam 54 on its upper surface (Fig. 6) to pass beneath post 55 which lifts tone arm 56 from the record. The tone arm is also oscillated in the course of slide movement but, this being conventional, it is not necessary to describe the mechanism in detail. It is sufficient to observe that due to this conventional mechanism the phonograph is set in operation and the stylus 57 of cartridge 58 at the end of the tone arm is lowered onto the record 59. The resulting message is amplified in a manner hereinafter to be described and communicated to the speaker 18. The sound issues from the grill 17 and is received by the mouth piece 60 of the telephone hand set 24 to inform the caller that his message will be received and recorded.

Figure 5:
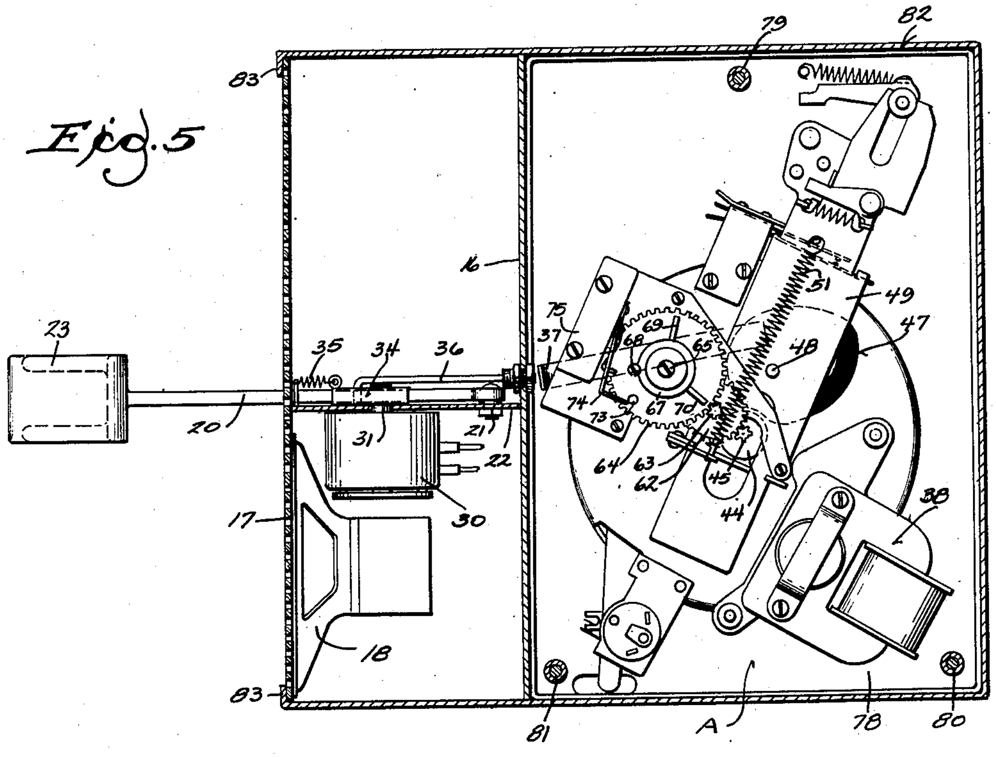
Fig. 5 is a view of the phonograph and portions of the control set in inverted plan, the housing being shown in horizontal section.
Figure 10:
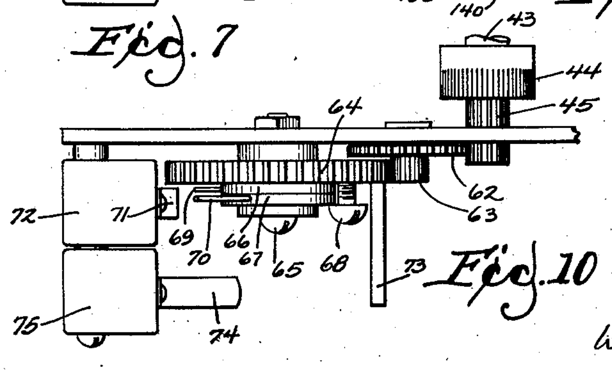
Fig. 10 is an enlarged detailed view in side elevation of the adjustable cam driven, for convenience, from the phonograph motor.

As already indicated, the turntable spindle 43 carries a pinion 45 added to it for the purposes of the present invention. Through a gear train comprising a gear 62 carrying another pinion 63 it drives a cam gear 64, as shown in Figs. 5 and 10. The screw 65 at the center of cam gear 64 rotatably mounts disks 66 and 67 which are held in angular adjustment by the clamping head of a screw 68 threaded to the face of the gear adjacent the peripheries of the disks. The respective disks 66 and 67 carry radially projecting pegs 69, 70. Their radial extent is such that in the course of gear rotation they will strike the actuator 71 of a switch 72 at an interval determined by the angular spacing between the pegs in the positions of relative rotative adjustment in which the disks are fixed by the clamping screw 68.

At substantially the same radial spacing from the axis of rotation of gear 64 is an axially extending post 73 which, in the course of gear rotation, will also strike and operate actuator 71 to close switch 72. However, since post 73 extends axially to a considerable distance below the gear, it is also adapted to strike and operate the actuator 74 for the closing of another switch 75, the physical location of which is immediately beneath switch 72, as clearly shown in Fig. 10. The functions of these switches will be explained hereinafter. It is sufficient to note here that they control the cycling of the rest of the apparatus to the end that after the initial message is delivered by the phonograph to the mouth piece of the telephone, the recorder is set in motion to receive the caller's message during an interval determined by the spacing between the pegs 69 and 70. At the conclusion of this interval, the circuits are re-established for delivery of the concluding message by the phonograph, after which the device shuts itself off, the cycle being concluded.

Figure 1:
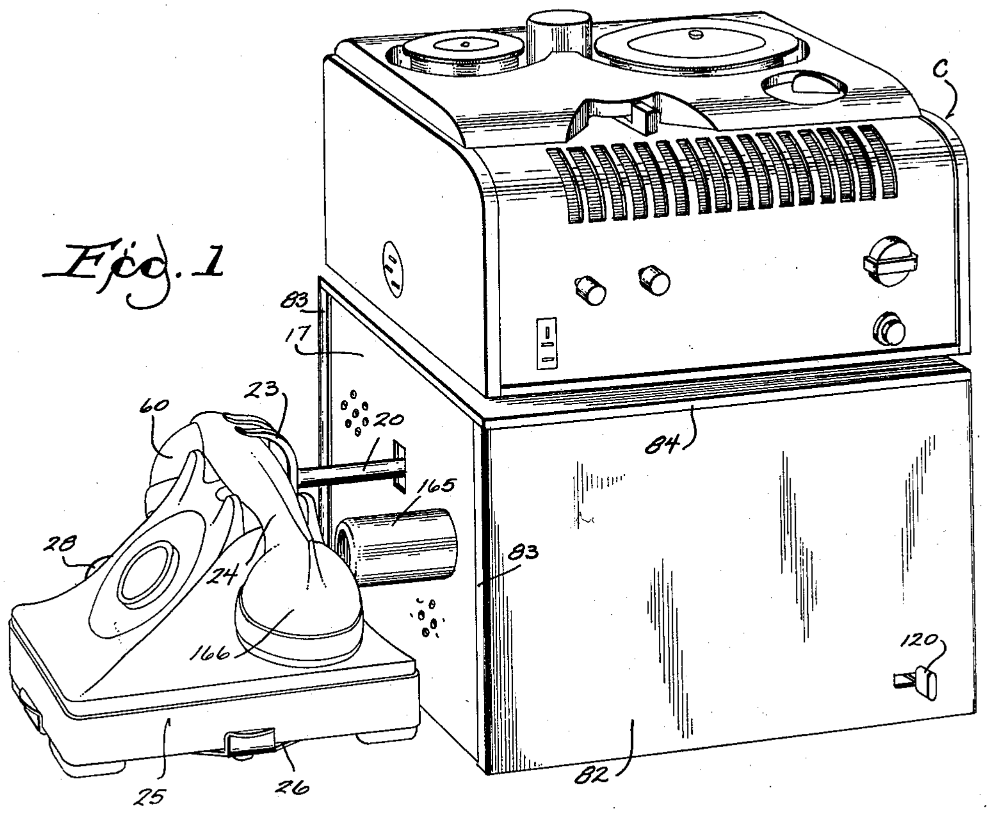
Fig. 1 is a view in perspective showing a device of the present invention as it appears in use.

Continuing with the description of the mechanical organization, it may be noted that the phonograph comprises a bed plate 78 supported on posts 79, 80 and 81 from the base of the control set. The base and the phonograph and the skeletonized housing portion 16 of the apparatus are embraced within the wall element 82 which is separately illustrated in Fig. 3 and which has terminal flanges at 83 engaged about the side margins of the perforated front panel 17. A cover 84 telescopically engaged over the wall element completes the enclosure of the control set and the phonograph B and provides a platform upon which the recorder C is mounted, as shown in Fig. 1.

Figure 12:
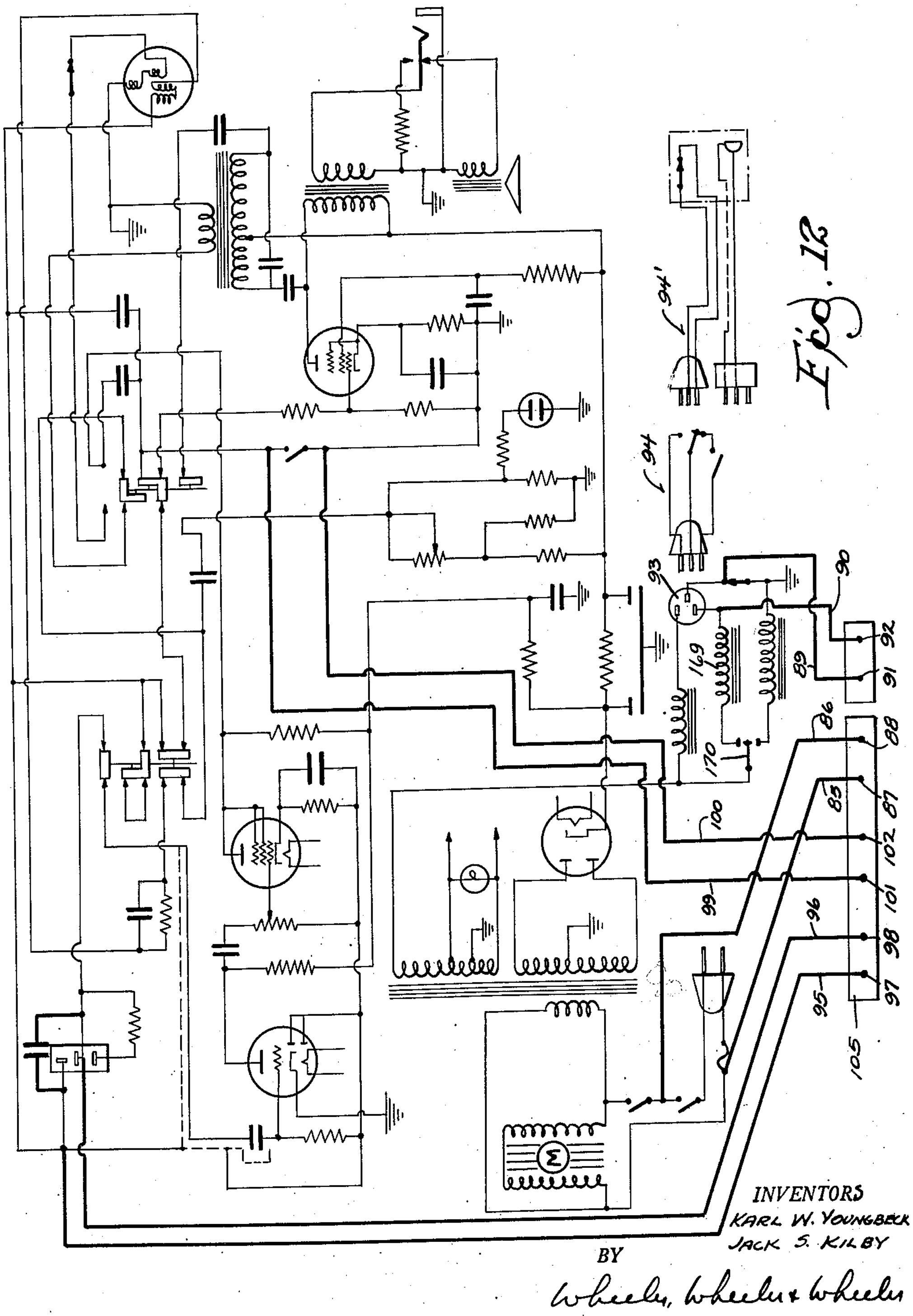
Fig. 12 is a wiring diagram illustratively showing one commercial recorder, added wiring being shown in heavy lines.

The recorder is almost entirely conventional. Any suitable wire recording or tape recording device may be used. The only changes required are those indicated in heavy lines in Fig. 12 showing the circuit diagram of a well-known commercial wire recorder or dictating machine. The only changes which have been made therein involve leads 85 and 86 from the recorder power source to receptacles 87 and 88 respectively; leads 89, 90 from receptacles 91, 92 respectively to the terminals of a receptacle 93 into which the foot switch assembly 94 and microphone switch assembly 94' are alternatively plugged in the normal use of the recorder; leads 95, 96 from receptacle 97 to the amplifier input of the recorder and back to receptacle 98; and leads 99 and 100 from receptacle 101 to the amplifier output of the recorder and back to receptacle 102.

A mounting plate 105 affixed to the side of the recorder unit C, as shown in Fig. 3, carries the several receptacles 97, 98, 101, 102, 87, 88 and, separately, 91 and 92. The control set A is provided with coupling cables 106 and 107. At the end of cable 106 is a plug 108 having jacks 109, 110, 111, 112, 113 and 114 adapted to register with and fit into receptacles 97, 98, 101, 102, 87 and 88, respectively. At the end of cable 107 is another plug 115 carrying jacks 116 and 117 complementary to receptacles 91 and 92, respectively. With the jacks unplugged from the receptacles, the recorder C is mechanically and electrically free for independent use. Even if the jacks are engaged in their respective receptacles, the recorder may be used in routine fashion by simply operating the master switch handle 120 which projects from the control set A and operates switches at 121, 122 and 123, as shown in the diagram, Fig. 11. The circuits controlled by these switches will be described later.

Figure 7:
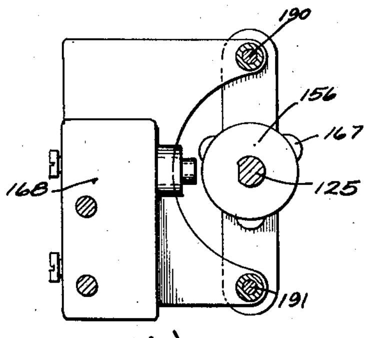
Fig. 7 is a detailed view taken on an enlarged scale on line 7—7 of Fig. 4.

Continuing with the description of the mechanical arrangement of the parts:

On the base of the control set A, there is rotatably mounted a control shaft 125, as best shown in Fig. 7. This shaft is indicated by a broken line in the wiring diagram of Fig. 11. Directly or indirectly, it operates a large number of switches. In some instances, the switch rotor is mounted directly on the shaft. In other instances, the shaft carries cams which engage and operate the switch actuator in the course of shaft rotation. As a matter of convenience, the present embodiment of the invention completes a cycle in 120 degrees of shaft rotation, the switch contacts and cams being therefore carried in sets of three so that in one complete rotation of the shaft three successive cycles of operation are completed. Shaft operation is effected by a solenoid 126, the armature 127 of which has a pawl 128 that engages successive teeth of a ratchet 129 on shaft 125 to rotate the shaft an angular distance corresponding to one tooth of the ratchet each time the solenoid 126 is energized.

Figure 11:
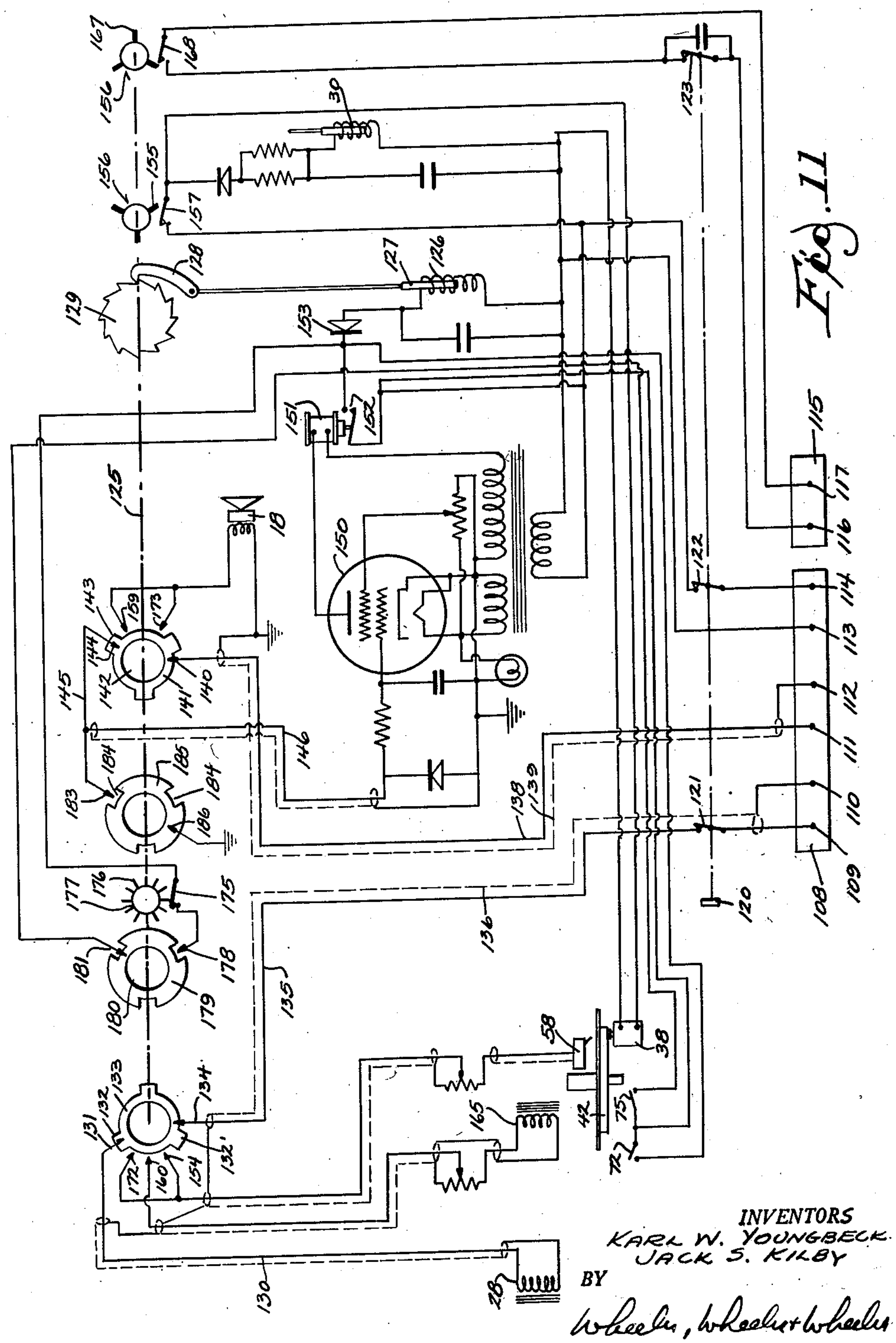
Fig. 11 is a wiring diagram of the control set.

Reference is now made to the electrical connections shown in the wiring diagram, Fig. 11.

The microphone 28, which picks up the electromagnetic impulses which ring the telephone bell, is connected, at the start of the cycle, to the input of the recorder amplifier. A shielded lead 130 extends from the microphone to a contact 131 engaged by the radially projecting contact 132 of a rotary contactor 133 on control shaft 125. The contactor is connected by brush 134 and line 135 through switch 121 to the plug 109 above referred to. In the assembled apparatus, it will be recalled that this plug is in a receptacle 97 wired to the amplifier input of recorder C. The return wire 96 is grounded through receptacle 98 and plug 110 to the shielding 136.

The amplified bell signal returns via wires 99 and 100 which have been added to the recorder to the receptacles 101 and 102 with which plugs 111 and 112 are engaged. These plugs respectively connect to the conductor 138 and shielding 139 of the control set wiring (Fig. 11). Lead 138 carries the amplified signal to a brush 140 bearing on the contact 141 of switch actuator 142 carried by control shaft 125. At this point at the commencement of the cycle, the radial contact arm 143 of contact 141 registers with, and engages, the fixed contact 144, which has an electrical connection through wires 145, 146 to the grid of the Thyratron or 2D21 tube 150. The impulse released by the firing of tube 150 energizes relay coil 151 to close switch 152 through which energy is carried through rectifier 153 to the solenoid 126 above referred to as means for reciprocating pawl 128 to index control shaft 125 for distance equal to one tooth of ratchet 129. This indexing advance of shaft 125, at the commencement of the cycle, initiates a sequence of operations which results in the functioning of the device as already described.

Referring back to the contact carrier 133 at the left hand end of control shaft 125, as viewed in Fig. 11, it will be observed that the first angular movement of the shaft will disengage contact 132 from contact 131 and will engage contact 132' with contact 154. Since the contactor of this switch is permanently connected through brush 134 with the amplifier, the engagement of contacts 132' and 154 serves to connect the phono cartridge 58 with the amplifier input of recorder C in readiness to receive the message recorded on record 59 for delivery through speaker 18 to the telephone mouth piece 60. Meantime, the peg 155 of camming device 156 on control shaft 125 closes switch 157 to energize the solenoid 30 which actuates the lifter 20 for the telephone hand set. Meantime, also, the switch contact 143 of contact carrier 142 engages stationary contact 159 which is connected through brush 140 and lead 138 with the amplifier output. The amplified message picked up by the phono cartridge is now delivered through the speaker to the hand set mouth piece, the lifting of the hand set having opened the telephone circuit so that the caller may receive such message.

As soon as the phonograph turntable has rotated for an interval controlled by the setting of cam peg 69, the engagement of such peg with switch actuator 71 closes switch 72. This switch is in parallel with the relay operated switch 152, which, as will be recalled, was energized through the Thyratron tube 150 to initiate the cycle. Therefore, the closing of switch 72 has the same result as the closing of switch 152 in that it energizes solenoid 126 to cause pawl 128 to interact with a tooth of ratchet 29 for the indexing advance of control shaft 125 to a third position.

In this third position, the contact 132' has moved away from contact 154 into engagement with contact 160 which leads from the voice pickup coil 165. As will be observed in Fig. 1, this coil is carried at the front of the cabinet in a position to pick up electromagnetic impulses which, in the telephone hand set instrument operate the conventional diaphragm (not shown) in the receiver 166. In other words, the pick up coil is now connected into circuit with the input of the amplifier of recorder unit C so that any message which the caller wishes to deliver to the subscribing party can be recorded on wire or tape or otherwise in the recording device.

Coincidentally, one of the switch actuating buttons 167 on the drum-like carrier 156 (Figs. 4 and 11) on shaft 125 closes switch 168 which energizes solenoid 169 (which is an integral part of the conventional recorder and is normally energized by a foot switch or microphone switch 94 or 94' to initiate recorder movement as shown in the recorder diagram in Fig. 12). The consequent closing of the start-stop switch 170 of the recorder causes the wire spools to revolve, exactly as in any conventional use of the recorder. The message of the telephone caller is thereby recorded in the conventional way, and it will be observed that the recorder was not in operation until it became necessary to receive this message. Waste of the recording medium (wire or tape) is thereby avoided.

It is further to be noted that in this third position of the parts, the disconnection of contact 132' from contact 154 cuts the phonograph cartridge from the circuit so that scratch noises are not communicated to the amplifier during the recording of the caller's message. The speaker is also disconnected, thus avoiding any possibility of feedback.

At the conclusion of an interval determined by the position to which cam peg 70 has been adjusted, the cam peg 70 will engage switch actuator 71 for a second actuation of the switch 72 (Fig. 5 and Fig. 11). Momentary closing of switch 72 again operates the ratchet indexing solenoid 126 to advance shaft 125 another step to a fourth position. In this position, the contact 132' of contact carrier 133 on the shaft engages fixed contact 172 which is in parallel with contact 154 and connected to the phonograph cartridge 58. Concurrently, switch 168 is opened to terminate movement of the recording medium (wire or tape). This leaves only the phonograph cartridge in connection with the recorder amplifier, the output end of which is now connected through contact carrier 141 and contact 143 with stationary contact 173 to the speaker 18 whereby the closing message on the phonograph record is delivered through the speaker to be picked up by the mouthpiece portion 60 of the telephone hand set for the benefit of the telephone caller.

Continued rotation of cam gear 64 finally brings the axially projecting cam post 73 into engagement with contact actuator 71 of switch 72 and contact actuator 74 of switch 75. As before, the closing of switch 72 (Figs. 5, 10 and 11) energizes the solenoid 126 for the indexing advance of shaft 125. This represents the close of the cycle. Inasmuch as the cycle is completed in but 120 degrees of shaft rotation, the contacts and cams respectively carried by the shaft 125 are not the same as those which function initially but they correspond thereto and are in the same relative positions as those shown in Fig. 11. In this starting position of shaft 125 the carrier drum 156 rotates its actuator button 155 to a position beyond switch 157, whereby this switch opens to permit the hand set lifter to fall in consequence of the de-energization of solenoid 30. This restores the hand set to the cradle of the telephone instrument to open the telephone circuit, leaving it available to receive another call. Since switch 157 also controls the phonograph motor 38, this motor is now at rest.

It is obviously important to the successful functioning of this device that the phonograph turntable and shaft 125 remain synchronized as to position. While the shaft 125 can not be moved except in consequence of the closing of the switches 152 or 72 which energize its indexing solenoid 126, the turntable of the phonograph might be rotated idly to a position in which the cam pegs 69, 70 and 73 of cam gear 64 driven from the turntable spindle might be displaced from their desired starting positions respecting the switch actuators 71 and 74 to be operated thereby. To restore the parts to synchronism, in the event any displacement occurs, I provide a "homing" mechanism which includes a third switch 175 (Fig. 11) connected across switches 152 and 72 as a means of energizing the indexing solenoid 126. This third switch is operated by any one of numerous pegs 176 of a star wheel 177 mounted on shaft 125. However, this third switch 175 has in series with it a switch comprising fixed contact 178 and moving contacts 179 of a contact carrier 180. The connection 181 to the carrier 180 on shaft 125 also has in series with it switch 75 which is normally closed and is opened when its actuator 74 is struck by peg 73 of cam gear 64.

The homing device operates as follows:

In the starting position, as above described, the peg 73 is supposed to be engaged with switch actuator 74 to open switch 75, as shown in Figs. 5 and 11. Any displacement of the turntable and cam gear 64 would disengage this peg from switch actuator 74, thus allowing switch 75 to close. Thus the closing of switch 75 in the starting position of the control shaft 125 could occur only in the event of lack of synchronism.

If this should happen, a circuit would also be closed between one of the contacts 179 and the stationary contact 178 to energize the indexing solenoid 126 to rotate shaft 125. However, any indexing rotation of shaft 125 under these circumstances would cause the cam pegs 176 of star wheel 179 to release and re-engage switch 175, thereby momentarily opening and then re-closing the circuit to solenoid 126. In this way, a succession of impulses is imparted to the solenoid to cause shaft 125 to index rapidly back to its starting point. Only then, with peg 73 engaged with switch actuator 74 will switch 75 be opened and only then will the circuit also be opened by disengagement of contact 179 of carrier 180 from contact 178. Thus the homing device assures restoration of the parts to synchronized position prior to the commencement of each cycle of operations.

It is desirable that the grid of the Thyratron trigger tube 150 be grounded at all times except at the commencement of the cycle when the Thyratron tube is needed to initiate the cycle. To this end, the lead 146 from the Thyratron grid is connected to the contact 183 which, with the mechanism at rest, registers with a notch 184 in the contact 185. A brush contact 186 permanently engaged with moving contact 185 is grounded. Consequently after the Thyratron tube has performed its triggering function and the shaft 125 has commenced its series of indexing movements, the moving contactor 185 engages fixed contact 184 to put the tube out of commission until the conclusion of the cycle, whereupon another one of the notches 184 will register with the fixed contact 183 to allow the grid of the Thyratron tube to resume functioning in readiness for a further triggering operation.

Figure 8:
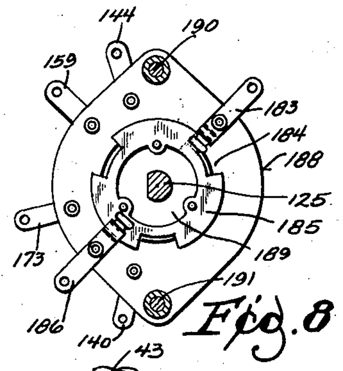
Fig. 8 is a detailed view taken in section on an enlarged scale on line 8—8 of Fig. 4.
Figure 9:
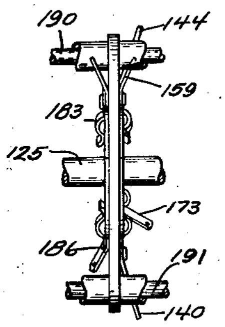
Fig. 9 is a view in side elevation of the structure shown in Fig. 8.

For convenience, the various moving contacts mounted on shaft 125 may, in some instances, be supported on contact carriers which are common to more than one switch. An illustrative example appears in Figs. 8 and 9. The fixed contact 183 and the brush contact 186 are both mounted on the stationary contact carrier 188 while the moving contact 185 is mounted on a rotating contact carrier 189 carried by shaft 125. On its other face, the rotating contact carrier 189 supports moving contact 141, while the other side of the fixed contact carrier 188 supports stationary contacts 144, 159, 173, and 140, thus combining in one unit the otherwise separate rotary switches shown in the wiring diagram, Fig. 11. Conveniently the various fixed contact carriers are supported on upper and lower rods 190, 191, as shown in Figs. 7 to 9.

We claim:

1. A telephone answering device comprising the combination with a control set comprising a trigger tube, switching means, telephone hand set lifting means, bell and voice pickups, and a speaker, of a phonograph comprising a record and a pickup, case means enclosing the control set and the phonograph and speaker, a unitary and independently operable recorder including an amplifier and a power source, detachable electrical connections from the power source to the control set, detachable electrical connections between the amplifier and the recorder and the control set, said connections including connections to said switching means for connecting the telephone bell pickup, the phonograph and the voice pickup successively to the recorder amplifier and for connecting the amplifier successively to said trigger tube and said speaker and said recorder.

2. The device of claim 1 in which said case means comprises a support upon which the recording unit rests and from which it is freely removable upon detaching the said electrical connections.

3. The device of claim 1 in which the bell and voice pickups are electromagnetic, the said control set having means for positioning a telephone instrument in operative relation to said pickups whereby said pickups are adapted to receive electromagnetic impulses from the telephone bell ringing circuit and voice circuit respectively.

4. In a telephone answering device for cyclically lifting from its cradle the hand set of a telephone and for delivering a message to said hand set and receiving a message therefrom, the combination with a conventional and unitary separate recording instrument including a power source, amplifier and recording means, control set elements comprising a triggering relay, a cycling switch device having means for its indexing advance, a phonograph having means for mechanically driving said cycling switch device, a loud speaker comprising means to deliver sounds to the telephone hand set, a pickup device disposed proximate the telephone instrument to receive bell ringing impulses therefrom, and a voice current pickup device disposed proximate the hand set to receive voice current impulses therefrom, of means for releasably connecting said elements to said amplifier to incorporate said amplifier electrically in the circuit of the control set elements.

5. The combination recited in claim 4 in further combination with switch indexing means comprising a solenoid and a plurality of switches connected in parallel to said solenoid for the energization thereof, said solenoid having an armature provided with means for the step by step advance of said switching means through a predetermined cycle of operation, means responsive to said cycle for closing one or another of said parallel switches, the closing of any of said parallel switches being adapted to index said switching means.

6. The device of claim 5 in which one of said parallel switches comprises a "homing" switch including further switch means and connections therefor for returning said indexing switching device to synchronism with said phonograph in the event of lack of synchronism.

7. In a telephone answering device, the combination with a control set including bell and voice pickups, a speaker, a triggering relay and a gang switch including directly operated and cam operated switching means, of a phonograph having a motor, a turntable, a stylus pickup and a timer, and a recorder provided with a power source and amplifier, the gang switch including a shaft, solenoid means having mechanical connections with said shaft for the indexing advance thereof to open and close the switch means operated thereby, said switch means including connections closed in a first position thereof from the bell pickup to the amplifier and from the amplifier to the triggering relay, these connections being opened in a second position of the gang switch shaft in which said gang switch includes connections closed from the phonograph pickup to the amplifier and from the amplifier to the speaker, these connections being opened in a third position of the gang switch shaft in which the gang switch has connections closed from the voice pickup to the amplifier and from the amplifier to the recorder, these connections being opened in a fourth position of the gang switch shaft.

8. In a device of the character described for answering a telephone and receiving a message from a caller, the combination with a control shaft and switch means actuated thereby, of electromagnetic means for indexing the shaft in successive steps comprising a cycle of operation and a circuit including said electromagnetic means and including a switch, and a motor driven timer having a rotor, a plurality of cams relatively angularly adjustable on the rotor and an actuator for said switch comprising a cam follower engaged by said cams in the course of rotor rotation to selectively energize and de-energize said electromagnetic means in response to the timer for effecting indexing movements of said shaft.

9. A device of the character described comprising a phonograph, a recorder, a bell pickup, a recording pickup, a timer, a speaker and an instrument lifter in combination with an amplifier, a control shaft provided with multiple switching means actuated by said shaft, electromagnetic means for the indexing advance of the shaft, and electrical connections controlled by said switching means and comprising means for connecting the amplifier successively with the bell pickup, the phonograph, and the recording pickup, said electromagnetic means having a plurality of switches in parallel, means connecting said switches to electromagnetic means, said electromagnet means being adapted to be energized by the closing of any one of them, means for closing said switches, one of said switches being connected with said timer to be closed thereby.

10. The device of claim 9 in which said amplifier comprises a unitary assembly with said recorder, said assembly being separately usable independently of the telephone answering device.

11. A device for answering a telephone which comprises a base having a cradle with a circuit controlling switch and a hand set having a mouth piece and an ear piece and normally mounted on the cradle in a position to open the cradle switch, said answering device comprising a control set having a control shaft, a plurality of switching means actuated by the shaft, a triggering relay, a hand set lifting arm having electrical means for its operation, means connecting said electrical means for control by one of said switching means, a bell pickup carried by the set and disposed adjacent the base of the telephone instrument to respond to electromagnetic bell-ringing impulses in the base, a microphone pickup connected with the set and disposed adjacent the position of the lifted receiver portion of the telephone hand set to respond to electromagnetic sound producing impulses in the telephone hand set, the speaker being proximate the position of the lifted mouth piece of the telephone hand set for delivering sound waves thereto, a phonograph comprising a stylus cartridge and record means for vibrating said cartridge to produce impulses for delivery to said speaker, electromagnetic means for indexing said control shaft for actuating said switching means in predetermined sequence in a given cycle, said last mentioned electromagnetic means having a plurality of switches for effecting its energization, one of said switches having operative connection with said triggering relay to be operated thereby, a timer having means for operating another of said switches and an amplifier serving the bell pickup, the microphone pickup, the phonograph cartridge, said switching means comprising means to successively connect said amplifier to said bell pickup, microphone pickup and phonograph cartridge, said switching means further comprising means to connect the amplifier output successively with said triggering relay and said speaker.

12. The device of claim 11 in further combination with a recorder unitarily providing a power source and said amplifier and means detachably connecting said power source and amplifier through said switching means with said control set, said switching means having connections from said recording pickup to said amplifier and from said amplifier to said recorder.

13. In a device of the character described in which a telephone hand set is lifted from its cradle to receive a phonographic message, the combination with a hand set lifter and electromagnetic means for the actuation thereof, of a slide and means mounting said slide to receive motion from said electromagnetic means and a phonograph having a cycle starting element operatively connected to receive motion from said slide whereby the electromagnetic means which lifts the telephone hand set also initiates the cycling of the phonograph.

14. In a device of the character described, the combination with a rotor and motor driven means for the actuation thereof, a plurality of cam carriers co-axially pivoted on the rotor for adjustment with respect thereto, means radially spaced from said axis for clamping the cam carriers in adjusted position, cams mounted on the respective carriers for movement with the rotor at an angular spacing determined by the aforesaid adjustment and switch means having actuator means in the path of cam rotation to be operated thereby as the rotor turns.

15. The device of claim 14 in which the rotor actuating means comprises a motor driven phonograph turntable spindle and gearing connections therefrom to said rotor.

References Cited in the file of this patent

UNITED STATES PATENTS

| | | |
|---|---|---|
| 2,261,420 | Shively et al. | Nov. 4, 1941 |
| 2,284,173 | Soukup et al. | May 26, 1942 |
| 2,374,842 | Shively et al. | May 1, 1945 |
| 2,549,548 | Von Zimmermann | Apr. 17, 1951 |
| 2,658,107 | Zimmermann | Nov. 3, 1953 |